(12) United States Patent  (10) Patent No.: US 6,742,790 B2
Seagraves et al.  (45) Date of Patent: Jun. 1, 2004

(54) HANDCART HAVING A PIVOTAL DECK AND METHOD OF OPERATING SAME

(75) Inventors: Steven G. Seagraves, Caledonia, MS (US); Wade Lawley, Fayette, AL (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/128,553

(22) Filed: Apr. 24, 2002

(65) Prior Publication Data

US 2003/0201618 A1 Oct. 30, 2003

(51) Int. Cl.⁷ ................................................ B62B 11/00
(52) U.S. Cl. ................................. 280/47.34; 280/79.11; 414/469
(58) Field of Search ................................. 414/490, 469, 414/474, 476, 480; 280/47.34, 47.371, 47.12, 79.11, 651, 43

(56) References Cited

U.S. PATENT DOCUMENTS

| | | | | |
|---|---|---|---|---|
| 1,706,253 A | | 3/1929 | Raymond | |
| 1,706,267 A | * | 3/1929 | Van De Mark et al. | 414/469 |
| 1,924,885 A | * | 8/1933 | Schreck | 414/434 |
| 2,215,529 A | * | 9/1940 | Nazarko | 414/490 |
| 2,342,430 A | * | 2/1944 | Schackelton | 414/469 |
| 2,696,928 A | * | 12/1954 | Faircloth et al. | 414/469 |
| 3,711,111 A | | 1/1973 | Crawford | |
| 3,826,512 A | * | 7/1974 | Palmer | 280/43.12 |
| 5,249,908 A | * | 10/1993 | Tsai | 414/490 X |
| 5,810,543 A | * | 9/1998 | Hall | 414/490 |
| 6,210,095 B1 | * | 4/2001 | Hempel et al. | 414/490 |

* cited by examiner

Primary Examiner—Bryan Fischmann
(74) Attorney, Agent, or Firm—Liniak, Berenato & White, LLC

(57) ABSTRACT

A handcart having a deck and a handle is disclosed which deck is pivotable between a generally horizontal load-carrying position and a tilted loading/unloading position by pivoting the handle. The handle is shiftable between first and second positions to lock and unlock the tilting mechanism. A method of using the subject handcart is also disclosed.

35 Claims, 5 Drawing Sheets

HANDCART HAVING A PIVOTAL DECK AND METHOD OF OPERATING SAME

FIELD OF THE INVENTION

This invention is directed to a handcart for use in transporting and unloading heavy loads such as baled materials, packaged wares, loaded pallets, and the like, and in particular, to a handcart having a pivotable cargo deck suited for receiving, transporting, and unloading baled materials prepared in a baling machine.

BACKGROUND OF THE INVENTION

A wide range of handcarts and hand trucks are known from the prior art that are designed to reduce the strain and labor associated with loading, transporting and unloading bulk materials in industrial, retail, and warehouse operations. Some of these devices include a pivot mechanism that facilitates the lifting and transporting of heavy bulk materials. For example, U.S. Pat. No. 3,826,512 to Palmer discloses a cart that includes a cargo deck adapted to pivot between a tilted loading position, in which the front edge of the cargo deck is lowered to facilitate the loading of goods, and a horizontal position for transporting goods. Similarly, U.S. Pat. No. 5,593,271 to Hall discloses a convertible barrow with a cargo deck that shifts between a lowered horizontal loading position and a raised horizontal transporting position.

Such devices reduce strain associated with loading heavy loads onto handcart decks. However, these devices either include no locking mechanism to control the shifting of the cargo deck between loading and unloading positions or use complicated locking mechanisms that require a user to stop the cart, remove at least one hand from the cart handle and manipulate the lock with his hand or, alternately, using his foot. This need to stop the moving handcart prevents operators from using the energy of the moving cart to facilitate discharging the goods from its cargo deck. For example, if Palmer's moving cart could be unlocked shortly before it reaches the unloading site, the cargo deck could be tilted to its lowered position and the momentum of the moving goods could be used to discharge the goods from the cart. Prior art tilting handcarts provide either hand or foot operated locking devices that can only be operated safely when the carts are stationary. It would therefore be desirable to provide a handcart that shifts between a horizontal carrying position and a tilted loading and unloading position, which cart can be locked in the carrying position with an easy-to-use handle-actuated mechanism that can optionally be engaged and disengaged while the cart is in motion.

SUMMARY OF THE INVENTION

These problems and others are addressed by the present invention which comprises a handcart having a handle and a support platform with a front edge that can be lowered to facilitate loading by pivoting the cart handle downwardly away from the cart and raised by returning the handle to a vertical position. In the preferred embodiment, the handle includes a catch mechanism that prevents it from pivoting until it is lifted by a user to release the catch from a keeper on another portion of the cart. Alternately, the keeper could be located on the handle and the catch associated with the support platform. In this manner, the pivoting mechanism can be locked and unlocked without the user removing his hands from the cart handle. The cart of the preferred embodiment includes a support platform or cart deck supported by one or more pairs of support wheels and a pivot mechanism supported by at least one wheel and pivotably connected to the cart deck. The pivot mechanism further includes a pivot wheel extending from the pivot mechanism in a direction opposite from the cart deck which pivot wheel engages the ground and serves as a fulcrum when the handle is pivoted downwardly. This motion also raises the pivot mechanism support wheel from the ground.

It is therefore a principal object of the present invention to provide a carrier having a front edge that can be moved relative to the ground.

It is a further object of the present invention to provide a cart having a deck that can be shifted between a generally horizontal transport position and an angled loading position.

It is another object of the present invention to provide a cart having a handle and a deck that can be shifted between a generally horizontal transport position and an angled loading position and selectively locked in the former position by manipulating the cart handle.

It is still another object of the present invention to provide a handcart having a locking handlebar arrangement that is operated to lock or unlock a tilting cargo deck.

It is still a further object of the present invention to provide a handcart with a tilting cargo deck capable of being locked or unlocked when the handcart is moving.

It is yet another additional object of the present invention to provide a handcart having a pivot connection positioned between two sets of running wheels.

It is an additional object of the present invention to provide an improved method for discharging a load from a handcart.

In satisfaction of the foregoing objects and advantages, the present invention provides a handcart comprising a cargo deck assembly supported on running wheels, a pivot assembly supported on running wheels and a pivot connection rotatably attaching the cargo deck assembly to the pivot assembly. The cart further includes a handlebar moveable within a fitting attached to the pivot assembly and a lock mechanism that is operated to releaseably lock the pivot connection to prevent or enable rotation between the cargo deck and the pivot assembly. The lock mechanism operates in response to handlebar movement within the fitting.

Another aspect of the invention comprises a cart having a first wheeled assembly including a load-bearing platform, at least one support wheel and a keeper which first assembly is pivotably connected to a second wheeled assembly including at least one support wheel. A handle is attached to the second wheeled assembly and includes a catch and is shiftable between a first position wherein the keeper retains the catch and a second position wherein the keeper is spaced from the catch.

A further aspect of the invention comprises a cart having a first wheeled assembly including a load-bearing platform and at least one support wheel and a second wheeled assembly pivotably connected to the first wheeled assembly and having at least one support wheel and at least one pivot wheel. A handle is attached to the second wheeled assembly and is pivotable about a first axis between a first position in which the first wheel engages a surface supporting the cart and a second position wherein the second wheel engages the surface.

A method for delivering a load using a handcart having a first handcart portion coupled to a second handcart portion, wherein the handcart is selectively supported on at least two sets of running wheels and at least one pivot wheel, is also disclosed. The method includes the steps of providing a rigid handcart by adjusting the position of a handlebar within a sliding fitting attached to the second handcart portion to engage a lock mechanism that rigidly couples the first handcart portion to a second handcart portion and thereafter positioning a load on the first handcart portion. Next, the rigid handcart is rolled toward a selected unloading site. The rigid handcart is then converted to an articulated handcart by adjusting the position of the handlebar within the sliding fitting to disengage the lock mechanism so that the first handcart portion is flexibly coupled to the second handcart portion. A force is applied to the rolling articulated handcart to rotate the pivot wheel to a position that supports the handcart and tilts the first handcart portion in a forward direction. Lastly, the handcart is stopped and the load is discharged.

Finally, a method of moving a load is disclosed that includes the steps of providing a cart having a first wheeled assembly having a load-bearing platform and least one support wheel and a second wheeled assembly pivotably connected to the first wheeled assembly and having at least one support wheel. A handle is attached to the second wheeled assembly, and a lock for locking the first assembly with respect to the second assembly is provided. The handle is moved to a first position to unlock the first assembly from the second assembly and pivoted to lower an edge of the platform. Next, a load is placed on the platform and the handle is pivoted to raise the edge of the platform. Lastly, the handle is moved to a second position to lock the first assembly to the second assembly.

BRIEF DESCRIPTION OF THE DRAWINGS

The above and other objects, advantages, and novel features of the present invention will become apparent from the following detailed description of the invention illustrated in the accompanying drawings, wherein.

DETAILED DESCRIPTION OF THE INVENTION

Figure 1:
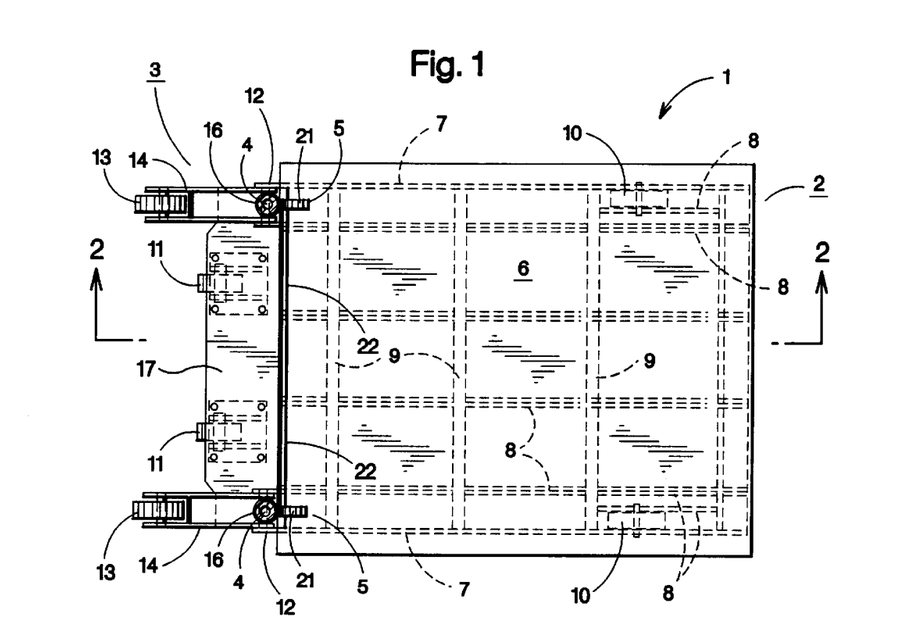
FIG. 1 is a top plan view of a handcart having a lockable pivot mechanism according to the present invention which handcart is shown with a portion of the handcart handlebar cut away.
Figure 2:
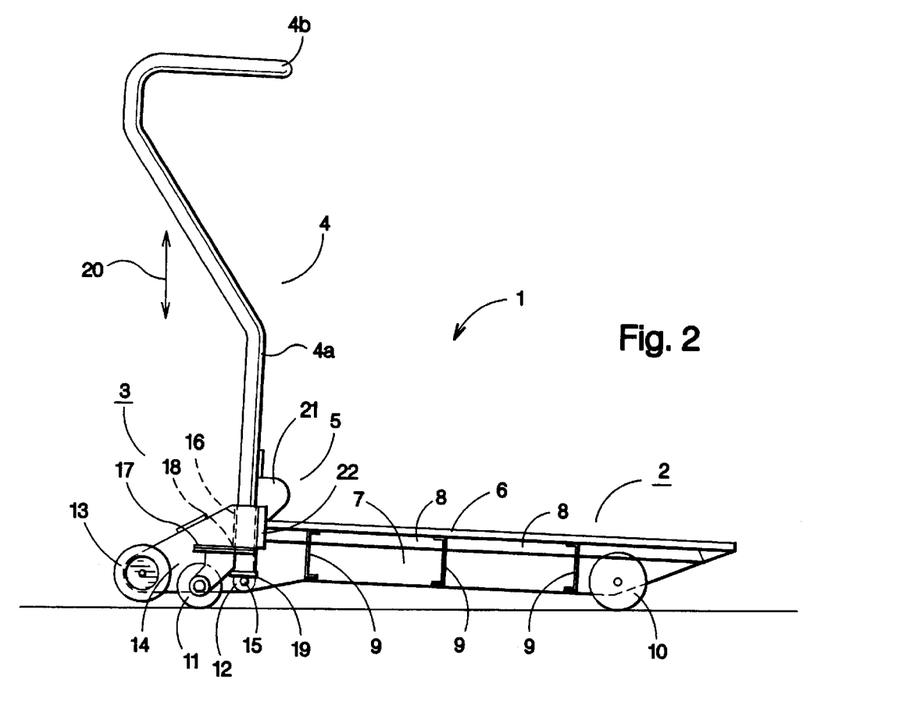
FIG. 2 is a cross-section view taken along line 2—2 of FIG. 1.

The following detailed description of the present invention is directed to a handcart for use in transporting and unloading heavy loads such as baled materials, packaged wares, loaded pallets, and the like, to a delivery site. Referring now to the drawings, wherein the showings are for the purpose of illustrating a preferred embodiment of the invention only and not for the purpose of limiting same, FIGS. 1 and 2 show a handcart 1 having a wheeled cargo deck assembly 2, a wheeled pivot assembly 3 fastened to the cargo deck assembly, and a handlebar 4 including a lock mechanism 5 that is operable to selectively allow tilting of the cargo deck 2. The handlebar 4 is broken away in FIG. 1 so that the pivot assembly 3 may be seen more clearly.

The cargo deck assembly 2 comprises a deck plate 6 supported on a structural framework that includes longitudinal side rails 7, a plurality of transverse channel members 9 that extend across the cargo deck below deck plate 6, and intermediate longitudinal rails 8 spaced apart between the side rails 7 and the channel members 9. The tilting cargo deck assembly is supported on at least one set of running wheels 10 rotatably fastened to the side rails 7 and/or intermediate rails 8 at a location proximate the front-end of the cargo deck opposite the handlebar 4 which is attached to the pivot mechanism at the rear end of the deck. The pivot assembly 3 is supported on a second set of running wheels 11 positioned rearward with respect to a pivot connection 12 that rotatably couples the pivot assembly 3 to the tilting cargo deck assembly 2. Because the pivot connection 12 is located between the two sets of running wheels, the handlebar lock mechanism 5 may be selectively operated to unfasten the tilting cargo deck 2 and thereby provide independent suspension between the tilting cargo deck and pivot assemblies 2 and 3 respectively. Such independent suspension may enable the tilting cargo deck assembly 2 and the pivot assembly 3 to separately navigate over certain surface irregularities such as ramps encountered between loading and unloading sites.

The pivot assembly 3 includes one or more pivot wheels 13 rotatably mounted within a yoke assembly 14 extending in a rearward direction (away from deck 2) from the above pivot connection 12. Each yoke assembly 14 is rotatably fastened to the tilting cargo deck assembly 2 at its respective pivot connection 12 with a pivot pin 15 (FIG. 2) that extends through apertures provided in the tilting cargo deck structural framework, for example the longitudinal side rails 7 and/or the longitudinal intermediate rails 8. Each yoke assembly further includes a tubular member 16 adapted to receive and slidably retain therein integral leg portions 4a of handlebar 4. A mounting plate 17 extends between the spaced apart yoke assemblies 14, and the mounting plate is fixed to the yoke assemblies by welding, bolting, or other suitable means. One or more holes 18 (FIG. 2) are drilled through mounting plate 17 at spaced apart locations to correspond with the tubular members 16. The drilled holes 18 are positioned to receive handlebar leg portions 4a extending through the tubular members 16, and an end cap 19 is fixed to the bottom end of each leg portion 4a to capture the handlebar legs within their respective tubular members and corresponding drilled holes 16 and 18. Other suitable means, such as pins extending through the pipes, could also be used for slidably retaining the leg portions 4a of the handlebar in the tubular members.

The second set of running wheels 11, comprising at least a single running wheel, and preferably two or more running wheels, is fastened to the mounting plate 17. The first set of running wheels 10, located toward the front-end of the tilting cargo deck assembly 2, and the second set of running wheels 11, attached to the pivot assembly 3, cooperate so that the tilting cargo deck assembly is rigidly supported on the running wheels 10 and 11 when the handlebar lock mechanism 5 is operated to lock the pivot connection 12 by engaging the tilting cargo deck assembly, and the tilting cargo deck assembly is flexibly supported on the running wheels 10 and 11 when the handlebar lock mechanism 5 is operated to unlock pivot connection 12 by disengaging the tilting cargo deck assembly.

In the preferred embodiment the handlebar 4 is U-shaped and includes a pair of handlebar legs 4a integrally formed with a crosspiece 4b extending between the upper ends of the legs. Each leg member 4a has one end inserted through one of the tubular members 16 that is attached to one of the corresponding yoke assemblies 14, and also through one of the corresponding holes 18 extending through the mounting plate 17. The end caps 19 are fastened to the ends of each handle bar leg member 4a to prevent the inserted legs from being pulled upwardly through the mounting plate holes 18 or the tubular members 16. The resulting sliding connection between the handlebar legs and the pivot assembly provides an arrangement for operating the lock mechanism 5 by either pulling or pushing handlebar 4 to raise or lower the handlebar as shown at arrow 20 (FIG. 2) to disengage or engage lock mechanism 5. End caps 19 limit the length of the pulled or pushed handlebar stroke by providing a stop that engages against the bottom surface of mounting plate 17. The handlebar lock mechanism includes at least one catch or hook 21 positioned to engage a keeper such as lock bar 22 when the handlebar pushed downward to a locking position, and disengage the 20 lock bar 22 when handlebar 4 is pulled upward to an unlocked position. Lock bar 22 is fixed to the tilting cargo deck assembly 2 so that when hook 21 engages lock bar 22, the pivot connection 12 is locked to prevent rotation, thereby fixing the cargo deck assembly to prevent tilting.

Figures 3A, 3B, 3C, 4:
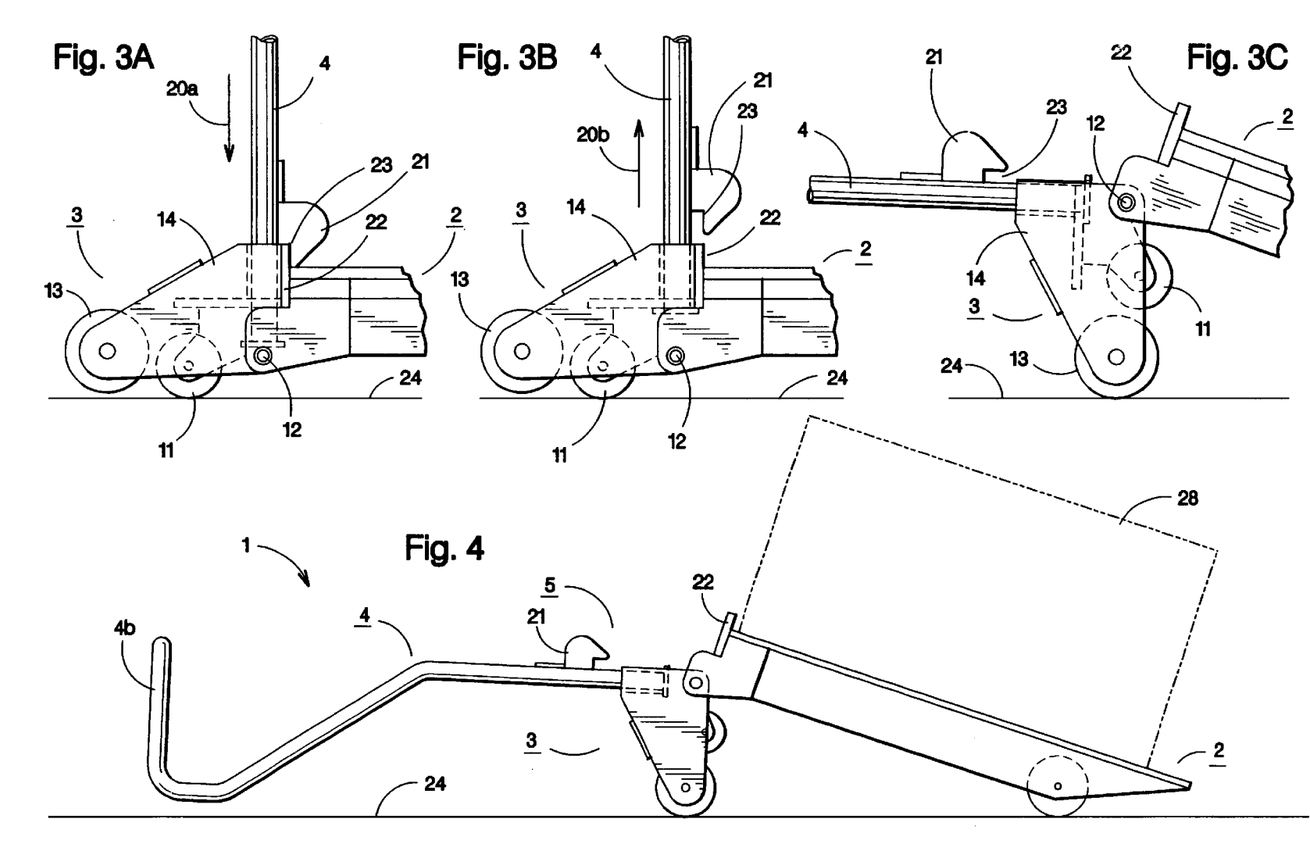
FIG. 3A is a side elevational view of the lockable pivot mechanism of claim 1 in a locked position with the cart deck horizontal.
FIG. 3B is side elevational view of the lockable pivot mechanism of claim 1 in an unlocked position with the cart deck horizontal.
FIG. 3C is side elevational view of the lockable pivot mechanism of claim 1 in an unlocked position with the cart deck tilted.
FIG. 4 is a side elevational view of the handcart of FIG. 2 with the handle in the lowered position.

Referring to FIGS. 3A–3C, showing an enlarged view of the lock mechanism, when handlebar 4 is pushed downward to its lowered locking position, as shown at arrow 20a (FIG. 3A), the first set of running wheels 10 and the second set of running wheels 11 cooperate to support the cargo deck assembly 2. When the tilting cargo deck is locked in its load transporting position, as shown in FIG. 3A, the mouth portion 23 of hook 21 engages lock bar 22 and prevents the cargo deck assembly 2 from rotating about the pivot connection. The locked pivot connection 12 also prevents rotation of the yoke assemblies 14 so that pivot wheels 13 are held at their rearward position, to prevent the pivot wheels from contacting the ground 24 when a load is being moved. Referring to FIG. 3B, if the handcart encounters a change in surface elevation, the handlebar may be pulled upward (arrow 20b) to disengage hook 21 from the lock bar 22 and thereby unlock the pivot connection 12 so that the tilting cargo deck assembly 2 and the pivot assembly 3 are free to rotate about the pivot connection. Because the unlocking operation may be preformed without removing an operators hands from the handlebar, the tilting cargo deck assembly may be unlocked to provide flexibility while the handcart is moving toward either a loading or unloading site. When handcart 1 is moved in its unlocked condition, the pivot wheels 13 may or may not contact the ground surface 24 depending upon particular loading and surface conditions.

Similarly, when the handcart of the present invention reaches an unloading site, the lock mechanism 5 is disengaged, as disclosed above for FIG. 3B. However, as shown in FIG. 3C, when the rolling handcart is near, or when the rolling handcart has finally reached its unloading site and the handcart is stopped, a combined rearward and downward rotational force is applied against handlebar 4 so that pivot assembly 3 rotates about pivot connection 12. The applied rotational force engages pivot wheels 13 against the ground or other support surface 24, and the continuing application of force tilts the cargo deck assembly 2 toward its front end to facilitate unloading. FIG. 4 shows the handcart in this unloading position.

Figure 6:
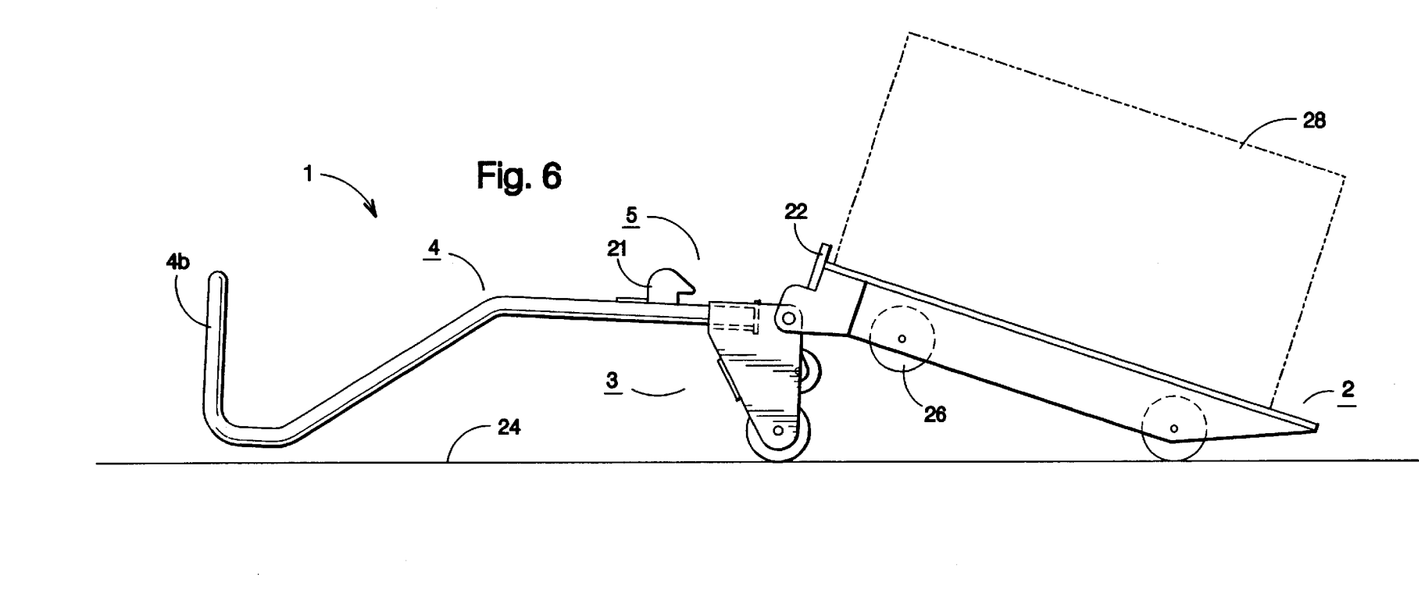
FIG. 6 is a side elevational view of a second embodiment of the handcart of the present invention.

FIG. 6 shows a second embodiment of the invention. The same reference numerals are used in this Figure to identify elements common to both embodiments. In this embodiment, cargo deck assembly 2 includes a second set of running wheels 26 in addition to first set of running wheels 10. The second set of running wheels provides additional support for the cargo deck and may be useful when transporting particularly heavy loads, but otherwise does not affect the functioning of the handcart.

EXAMPLE

Figure 5A:
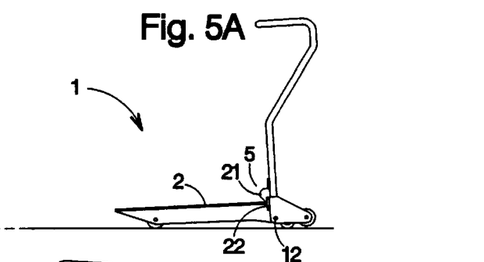
FIGS. 5A–5J show various steps of a method for using the present handcart invention to transport a load.
Figure 5B:
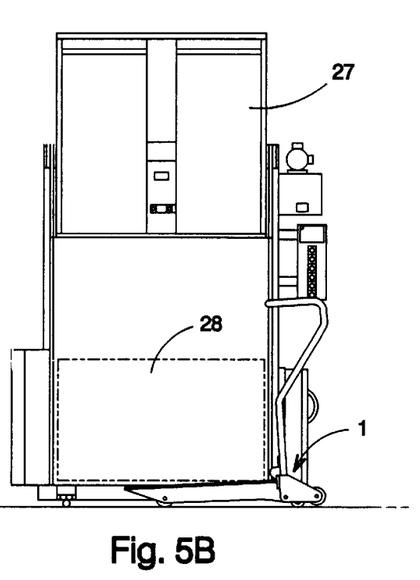
Figure 5C:
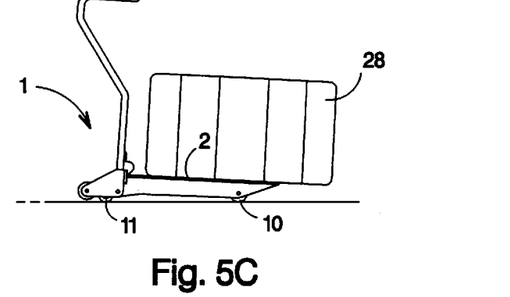
Figure 5D:
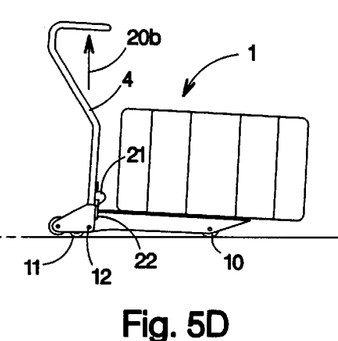
Figure 5E:
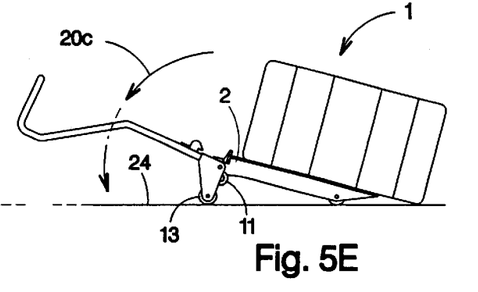
Figure 5F:
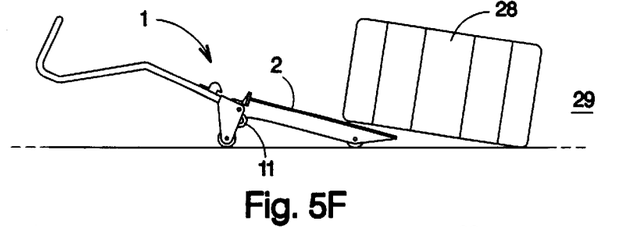
Figure 5G:
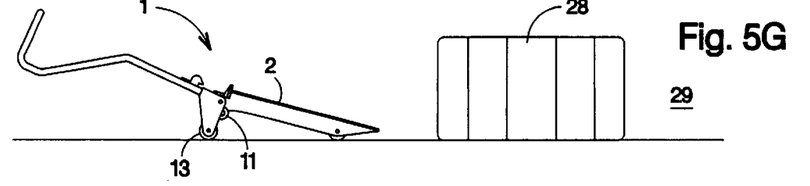
Figure 5H:
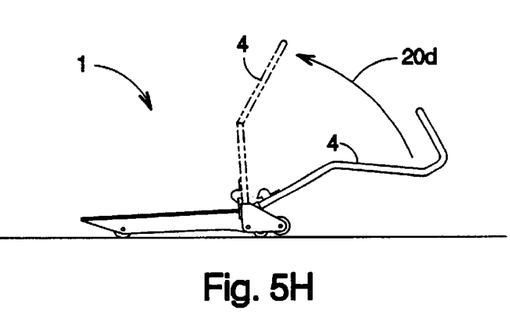
Figure 5I:
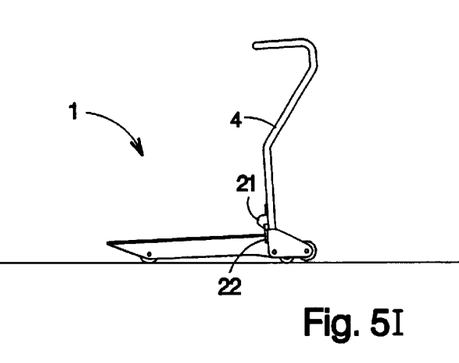
Figure 5J:
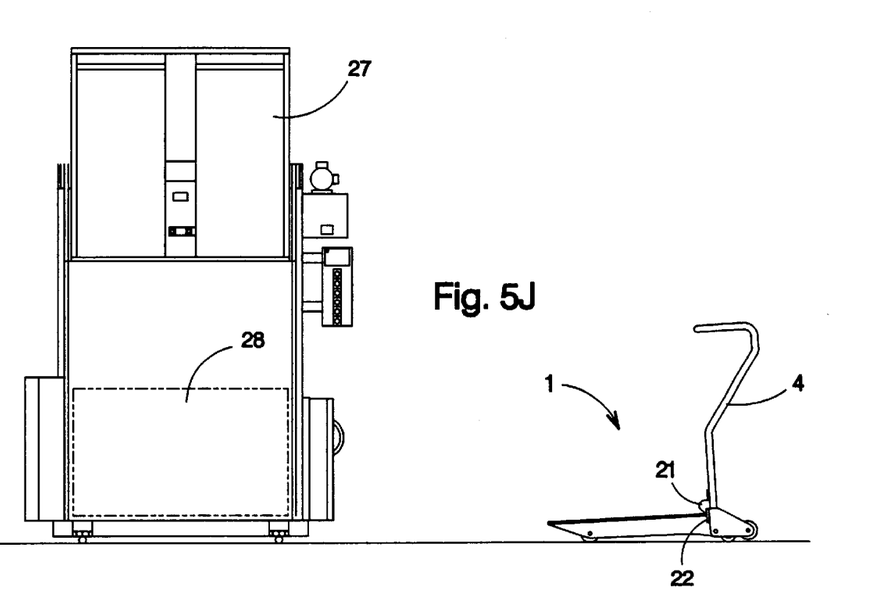

Referring to FIGS. 5A–5J, a series of steps are shown for loading and delivering a load using the present handcart invention. In FIG. 5A, handcart 1 is prepared to receive a load by operating the lock mechanism 5 to engage hook 21 against lock bar 22. This prevents rotation about pivot connection 12 and tilting of cargo deck assembly 2. The locked handcart 1 is then rolled toward a loading site to receive a load. Referring to FIG. 5B, in this example, handcart 1 is pushed into the discharge end of a scrap bailer 27 to receive a load of bailed scarp material 28. Such scrap bailers are manufactured by, for example, the Marathon Equipment Company. However, it should be understood that the scrap bailer shown in FIGS. 5B and 5J is only exemplary, and that the scope of the invention includes any type load loaded onto the present handcart invention.

Referring to FIG. 5C, after a load 28 is placed on the tilting cargo deck 2, the loaded handcart is rolled toward an unloading site on its running wheels 10 and 11. Because the locked handcart 1 is supported on at least two sets of running wheels, load placement is not critical with respect to balancing the load on the cargo deck as compared to prior art handcarts on which the load is balanced on a single set of running wheels.

When the loaded handcart 1 approaches an unloading site (FIG. 5D), and while the handcart 1 may continue to roll on its running wheels 10 and 11 toward the unloading site, the handlebar 4 is pulled upward as shown at arrow 20b to disengage hook 21 from lock bar 22 and unlock the pivot connection 12. A combined rearward and downward rotational force is applied against the unlocked handlebar 4 so that the pivot assembly 3 rotates about the pivot connection 12, as shown by arrow 20c in FIG. 5E. The applied rotational force engages pivot wheels 13 against the ground 24, and the continuing rotational force may drive the pivot wheels 13 in a forward direction and raise and tilt the cargo deck assembly 2 toward its front end. When the tilted handcart 1 reaches the unloading site 29, shown in FIGS. 5F and 5G, it is stopped (FIG. 5F), and the energy of the forward moving load 28 facilitates discharging at least a portion of the load from the tilted cargo deck assembly 2. If load 28 is not completely discharged from the tilted deck 2 as shown in FIG. 5F, the tilted deck 2 is easily pulled from beneath load 28 as illustrated in FIG. 5G.

After load 28 is removed from the tilted cargo deck assembly 2, handlebar 4 is rotated in an upward and forward direction, as shown by the arrow 20d in FIG. 5H, to return the handlebar to the locking position shown in FIG. 5I, where the handlebar is pushed in a downward direction to engage hook 21 against lock bar 22. Referring to FIG. 5J, after handlebar 4 is pushed in a downward direction to engage the lock hook 21 against lock bar 22, the cargo deck assembly 2 is ready for insertion into the scrap bailer 27 to receive a new load 28, or handcart 1 is ready to receive a different load from a different loading site.

It should be understood that while this invention has been described in terms of a preferred embodiment, it is capable of further modifications, uses, and/or adaptations following the general principles of the invention set forth above. All such departures from the present disclosure that fall within known or customary practice in the art to which the invention pertains, and as may be applied to the central features hereinbefore set forth, are intended to be included within this invention to the extent they are included within the scope of the several claims appended hereto.

We claim:

1. A handcart, comprising:
    a cargo deck assembly supported on running wheels;
    a pivot assembly supported on running wheels;
    a pivot connection rotatably attaching said cargo deck assembly to said pivot assembly; and
    a handlebar moveable within a fitting attached to said pivot assembly, said handlebar including a lock mechanism that is operated to releaseably lock said pivot connection to prevent or enable rotation between said cargo deck assembly and said pivot assembly, said lock mechanism operated in response to handlebar movement within said fitting.

2. The handcart of claim 1, comprising at least one pivot wheel attached to said pivot assembly so that said at least one pivot wheel and said running wheels of the pivot assembly alternately support said handcart in response to said pivot assembly being rotated about said pivot connection.

3. The handcart of claim 2 wherein said handcart is supported on at least two sets of running wheels.

4. The handcart of claim 2 wherein said handcart is supported on at least two sets of running wheels and at least one pivot wheel.

5. The handcart of claim 1 wherein said handlebar is slideably retained within said fitting.

6. The handcart of claim 5 wherein said fitting is a tubular member attached to said pivot assembly.

7. The handcart of claim 6 wherein said lock mechanism includes a hook that engages a lock bar attached to said cargo deck assembly.

8. The handcart of claim 7 comprising at least one pivot wheel attached to said pivot assembly so that said at least one pivot wheel and said running wheels of the pivot assembly alternately support said handcart in response to said pivot assembly being rotated about said pivot connection.

9. The handcart of claim 8 wherein said handlebar is moved to slide within said tubular member to a position that disengages said hook from said lock bar so that said at least one pivot wheel attached to said pivot assembly may be rotated about said pivot connection, said at least one pivot wheel rotated to support said handcart, lift said running wheels of the pivot assembly away from a support position, and tilt said cargo deck assembly in a forward direction.

10. A method for delivering a load using a handcart having a first handcart portion coupled to a second handcart portion where the handcart is selectively supported on at least two sets of running wheels and at least one pivot wheel, the steps of the method comprising:
    providing a rigid handcart that allows the position of a handlebar within a sliding fitting attached to said second handcart portion to engage a lock mechanism that rigidly couples said first handcart portion to a second handcart portion;
    positioning a load on said first handcart portion;
    rolling said rigid handcart toward a selected unloading site;
    converting said rolling rigid handcart to an articulated handcart by adjusting the position of said handlebar within said sliding fitting to disengage said lock mechanism so that said first handcart portion is flexibly coupled to said second handcart portion;
    applying a force to said rolling articulated handcart that rotates said pivot wheel to a position that supports said handcart and tilts said first handcart portion in a forward direction;
    stopping said rolling articulated handcart having a tilted first handcart portion; and
    discharging said load from said tilted first handcart portion.

11. The method recited in claim 10 whereby said pivot wheel is rotated by applying a force to said handlebar.

12. The method recited in claim 10 whereby said rigid handcart is moved by rolling said handcart on at least two sets of running wheels.

13. The method recited in claim 10 whereby said articulated handcart is moved by rolling said handcart on at least one set of running wheels and at least one pivot wheel.

14. The method recited in claim 10 including the step of suddenly stopping said rolling handcart and using energy in said moving load to at least partially discharge said load from said tilted first handcart portion.

15. The method recited in claim 10 whereby said pivot wheel is rotated to a position that supports said handcart and tilts said first handcart portion in a forward direction is carried out when said handcart is not rolling.

16. A cart comprising:
    a first wheeled assembly including a load-bearing platform, at least one support wheel and a keeper;
    a second wheeled assembly pivotably connected to said first wheeled assembly and including at least one support wheel; and
    a handle attached to said second wheeled assembly and including a catch, said catch being a part of said handle, said handle being shiftable between a first position wherein said keeper retains said catch and a second position wherein said keeper is spaced from said catch.

17. The cart of claim 16 wherein said keeper comprises an upstanding wall.

18. The cart of claim 16 wherein said catch comprises a hook.

19. The cart of claim 16 wherein said load bearing platform lies in a first plane and said handle is shiftable in a direction normal to said first plane.

20. The cart of claim 19 wherein said handle is pivotable about an axis parallel to said first plane when said handle is in said second position.

21. The cart of claim 20 wherein said second wheeled assembly includes at least one pivot wheel adapted to engage a surface supporting said cart when said handle is pivoted about said axis.

22. A cart comprising:
    a first wheeled assembly including a load-bearing platform and at least one support wheel;
    a second wheeled assembly pivotably connected to said first wheeled assembly and including at least one support wheel and at least one pivot wheel; and a handle attached to said second wheeled assembly, said handle being pivotable about a first axis between a first position in which said support wheel engages a surface supporting said cart and a second position wherein said pivot wheel engages said surface.

23. The cart of claim 22 wherein said first wheel is spaced from said surface when said handle is in said second position.

24. The cart of claim 22 wherein said second wheel is spaced from said surface when said handle is in said first position.

25. The cart of claim 22 including locking means for locking said first wheeled assembly with respect to said second wheeled assembly.

26. The cart of claim 22 wherein said one of said first wheeled assembly and said second wheeled assembly includes a keeper and wherein the other of said first wheeled assembly and said second wheeled assembly includes a catch.

27. The cart of claim 26 wherein said keeper is mounted on said handle.

28. A method of moving a load comprising the steps of:
providing a cart including a first wheeled assembly having a load-bearing platform and least one support wheel, a second wheeled assembly pivotably connected to said first wheeled assembly and having at least one support wheel, a handle attached to said second wheeled assembly, and a lock for locking said first wheeled assembly with respect to said second wheeled assembly;
moving said handle to a first position to unlock said first wheeled assembly from said second wheeled assembly;
pivoting said handle to lower an edge of said platform;
placing a load on said platform;
pivoting said handle to raise said edge of said platform; and
moving said handle to a second position to lock said first wheeled assembly to said second wheeled assembly.

29. The method of claim 28 including the additional step of moving said cart from a first location to a second location.

30. The method of claim 29 including the additional steps of moving said handle to said first position, pivoting said handle to lower said edge of said platform and removing said load from said platform.

31. The method of claim 30 including the additional steps of pivoting said handle to raise said edge of said platform and moving said handle to said second position.

32. A cart comprising:
a first assembly including a load-bearing platform, at least one support wheel and a keeper;
a second assembly pivotably connected to said first assembly and including at least one support wheel and a catch, wherein said catch is engageable with said keeper to prevent said platform of said first assembly from pivoting relative to said second assembly; and,
a handle movable between a lower position wherein said catch engages said keeper, and an upper position wherein said keeper is disengaged from said catch,
movement of said handle from said lower position to said upper position causes said keeper to be disengaged from said catch and thereby allows said first assembly platform to pivot relative to said second assembly.

33. The cart described in claim 32 wherein said handle extends normal to said load bearing platform when said keeper is disengaged from said catch.

34. The cart as described in claim 33 wherein said second assembly has two support wheels.

35. The cart as described in claim 33 wherein said handle has a first leg portion, a second leg portion, and an intermediate portion connecting said first leg portion to said second leg portion,
said first leg portion attaches to a first corner of said second assembly,
said second leg portion attaches to a second corner of said second assembly,
said first and second corners abut said first assembly.

* * * * *